(12) United States Patent
Redding et al.

(10) Patent No.: US 12,104,972 B2
(45) Date of Patent: Oct. 1, 2024

(54) MULTIPLEXED LONG-RANGE FIBER OPTIC SENSING

(71) Applicant: The Government of the United States of America, as represented by the Secretary of the Navy, Arlington, VA (US)

(72) Inventors: Brandon F. Redding, University Park, MD (US); Clay Kingsley Kirkendall, Fairfax, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 265 days.

(21) Appl. No.: 17/935,958

(22) Filed: Sep. 28, 2022

(65) Prior Publication Data
US 2023/0095024 A1  Mar. 30, 2023

Related U.S. Application Data

(60) Provisional application No. 63/261,763, filed on Sep. 28, 2021.

(51) Int. Cl.
 *G01L 1/24* (2006.01)
(52) U.S. Cl.
 CPC .................... *G01L 1/246* (2013.01)
(58) Field of Classification Search
 CPC ...... G01L 11/02; G01L 9/0077; G01L 11/025; G01L 9/0076; G01L 9/0079;
(Continued)

(56) References Cited

U.S. PATENT DOCUMENTS 6,888,125 B2 * 5/2005 Ronnekleiv ........ G01D 5/35383
250/227.19
10,234,346 B2 * 3/2019 Dong ................... E21B 47/135
(Continued)

FOREIGN PATENT DOCUMENTS

AU 2013397601 B2 * 10/2016 ......... G01D 5/35306
EP 4310457 A1 * 1/2024 ......... G01D 5/35306

OTHER PUBLICATIONS

Duran et al., "Coherent multi-heterodyne spectroscopy using acousto-optic frequency combs," Optics Express, vol. 26, Issue 11, May 28, 2018, 10 pages.
(Continued)

*Primary Examiner* — Andre J Allen
(74) *Attorney, Agent, or Firm* — US Naval Research Laboratory; Hong-Vinh Nguyen

(57) ABSTRACT

Multiplexed fiber optic sensors are able to monitor a multitude of sensor positions along an optical fiber from a single interrogation point. A long-standing goal is to increase the length of fiber and the number of multiplexed sensors without significantly compromising performance or increasing the size, weight, power and cost of the fiber and interrogation system. A technique is provided for performing extremely long-range, multiplexed fiber optic strain sensing in an efficient manner. This technique utilizes a serial optical frequency comb based interrogation system to probe an array of sensors placed along a single optical fiber.

14 Claims, 4 Drawing Sheets

(58) Field of Classification Search
CPC ..... G01L 9/0007; G01L 9/0039; G01L 23/16; G01L 9/0032; G01L 19/12; G01L 1/24; G01L 19/04; G01L 1/241; G01L 1/246; G01L 9/002; G01L 9/0097; G01L 9/0072; G01L 1/243; G01L 1/245; G01L 19/0092; G01L 9/0088; G01L 11/004; G01L 11/008; G01L 19/08; G01L 7/18; G01L 9/0073; G01L 9/0075; G01L 9/0089; G01L 9/008; G01L 7/086; G01L 9/0022; G01L 19/0645; G01L 27/002; G01L 9/0001; G01L 1/044; G01L 11/00; G01L 19/083; G01L 19/086; G01L 19/14; G01L 19/148; G01L 21/00; G01L 9/0014; G01L 9/0042; G01L 9/0052; G01L 13/00; G01L 19/0084; G01L 19/0618; G01L 23/221; G01L 7/065; G01L 9/0023; G01L 1/02; G01L 1/247; G01L 19/0007; G01L 19/003; G01L 19/0627; G01L 19/0681; G01L 19/147; G01L 23/22; G01L 27/005; G01L 5/228; G01L 9/0011; G01L 9/0026; G01L 9/0041; G01L 9/0051; G01L 9/14; G01L 1/142; G01L 1/148; G01L 1/16; G01L 1/18; G01L 11/04; G01L 13/02; G01L 13/023; G01L 15/00; G01L 17/00; G01L 19/142; G01L 19/143; G01L 7/045; G01L 9/0019; G01L 9/0033; G01L 9/08; G01L 9/085; G01L 1/103; G01L 1/186; G01L 1/242; G01L 11/006; G01L 13/021; G01L 13/025; G01L 13/026; G01L 19/0015; G01L 19/0061; G01L 19/02; G01L 19/069; G01L 19/10; G01L 21/16; G01L 23/08; G01L 23/24; G01L 5/14; G01L 7/04; G01L 7/041; G01L 7/043; G01L 9/0002; G01L 9/0005; G01L 9/0013; G01L 9/0044; G01L 9/0047; G01L 9/0055; G01L 9/006; G01L 9/007; G01L 9/0082; G01L 9/0085; G01L 9/0086; G01L 9/06; G01L 9/12; G01L 13/04; G01L 19/0023; G01L 19/06; G01L 19/0672; G01L 23/10; G01L 23/18; G01L 27/007; G01L 7/026; G01L 7/187; G01L 7/20; G01L 9/0008; G01L 9/0025; G01L 9/0029; G01L 9/0054; G01L 9/0083; G01L 9/0092
USPC .......................................................... 73/705
See application file for complete search history.

(56) References Cited

U.S. PATENT DOCUMENTS 10,935,398 B2 * 3/2021 Austin ................ G01H 9/004
2021/0389163 A1 * 12/2021 Eyal ....................... G01H 11/08

OTHER PUBLICATIONS

Cranch et al., "Large-Scale Remotely Interrogated Arrays of Fiber-Optic Interferometric Sensors for Underwater Acoustic Applications," IEEE Sensors Journal, vol. 3, Issue 1, Feb. 2003, pp. 19-30, 12 pages.
He et al., Ultrahigh Resolution Fiber Bragg Grating Sensors for Quasi-Static Crustal Deformation Measurement, Journal of Lightwave Technology, vol. 35, Issue 16, Aug. 15, 2017, pp. 3334-3346, 13 pages.
Zhao et al., "Resonant fiber-optic strain and temperature sensor achieving thermal-noise-limit resolution," Optics Express, vol. 29, Issue 2, Jan. 18, 2021, pp. 1870-1878, 9 pages.
Littler et al., "Pico-strain multiplexed fiber optic sensor array operating down to infra-sonic frequencies," Optics Express, vol. 17, Issue 13, Jun. 22, 2009, 11 pages.
Hodgkinson et al., "Pulsed Operation of an Optical Feedback Frequency Synthetiser," Electronics Letters, vol. 16, Issue 15, Mar. 15, 2020, pp. 1155-1156, 2 pages.
Black, Eric, "An introduction to Pound-Drever-Hall laser frequency stabilization," American Journal of Physics, vol. 69, Issue 1, Jan. 2001, pp. 79-87, 10 pages.
Zhao et al., "Multi-Tone Pound-Drever-Hall Technique for High-Resolution Multiplexed Fabry-Perot Resonator Sensors," Journal of Lightwave Technology, vol. 38, Issue 22, Nov. 15, 2020, pp. 6379-6384, 6 pages.
Gagliardi et al., "Probing the Ultimate Limit of Fiber-Optic Strain Sensing," Science, vol. 330, Issue 6007, Nov. 19, 2010, pp. 1081-1084, 5 pages.

* cited by examiner

MULTIPLEXED LONG-RANGE FIBER OPTIC SENSING

CROSS-REFERENCE TO RELATED APPLICATION

This application is a non-provisional of and claims the benefit of U.S. provisional application No. 63/261,763, filed Sep. 28, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case No. 210804-US2.

BACKGROUND

Multiplexed fiber optic sensors are able to monitor a multitude of sensor positions along an optical fiber from a single interrogation point. As a result, fiber optic sensors have been used in a range of applications including perimeter security, structural health monitoring, seismic detection, and oil and gas pipeline monitoring. A long-standing goal is to increase the length of fiber and the number of multiplexed sensors without significantly compromising performance (e.g., sensor self-noise and bandwidth) or increasing the size, weight, power, and cost (SWAP-C) of the fiber and interrogation system.

Traditional fiber sensors, such as erbium doped fiber laser sensors and Rayleigh distributed acoustic sensors, suffer from certain issues while meeting a required sensitivity. These issues include large sensor sizes (e.g., 10 m), short ranges (e.g., 1-10 km), or multiplexing difficulties (e.g., one sensor requires a dedicated laser and detector and/or a limited number of sensors). There are a couple of fiber sensing modalities that have longer ranges, but these also suffer from multiplexing difficulties.

For example, traditional interferometric fiber sensors constructed using discrete components may operate at a long range with low noise. These systems often use a combination of temporal and wavelength multiplexing to probe multiple sensors. However, these interferometric fiber sensors require dedicated components such as fiber couplers and wavelength division multiplexing filters to construct each sensor. Constructing these sensors requires manual labor, increasing the system cost and complexity. In addition, these components invariably add loss, which can limit the overall fiber length and/or the number of sensors that can be multiplexed on a single fiber. Finally, wavelength multiplexing schemes require dedicated lasers and detectors for each wavelength channel, increasing the interrogator cost and complexity. A final disadvantage of traditional interferometric fiber sensors is that their strain sensitivity scales with the length of fiber used to form the sensor. Reaching high strain sensitivity often requires ~10 m of fiber to be wrapped on a sensing element such as a mandrel. This increases the bulkiness of the sensing fiber and complicates the fiber deployment.

As another example, fiber Fabry-Perot interferometer (FFPI) based sensors have proven to be particularly well-suited for performing ultra-low noise measurements. While this approach has enabled exceptional performance at the individual sensor level, the vast majority of FFPI systems are limited to point sensors (i.e., the fiber contains a single FFPI and the system only measures the strain at one position along the fiber). However, many fiber sensing applications require distributed or quasi-distributed sensing over long distances, and using a dedicated fiber and interrogation system (i.e., the laser, modulators, photodetector, and control electronics) to probe each sensor is unrealistic from a size, weight, power, and cost (SWAP-C) perspective. To date, there have been only a few attempts to develop multiplexed FFPI based sensors. For example, a wavelength multiplexed FFPI sensor design has been proposed that requires a dedicated laser, modulator and photodetector to probe each of the FFPI sensors. Due to the component high cost and inefficient scaling, this design only includes four sensors. Another scheme combines temporal and spatial multiplexing in each FFPI sensor positioned on separate fibers. While this approach uses a single laser and detector, it sacrifices the sample rate at each sensor, significantly limiting the scalability of the approach, and the system only probes three sensors. Yet another scheme has been proposed that uses FFPIs with different free-spectral range as a multiplexing scheme. However, this approach has poor scalability and is limited to probing two sensors.

SUMMARY

This Summary is intended to introduce, in simplified form, a selection of concepts that are further described in the Detailed Description. This Summary is not intended to identify key or essential features of the claimed subject matter, nor is it intended to be used as an aid in determining the scope of the claimed subject matter. Instead, it is merely presented as a brief overview of the subject matter described and claimed herein.

Embodiments described herein are directed to a method and apparatus for performing extremely long-range, multiplexed fiber optic strain sensing in an efficient, low-SWAP-C manner. This sensing scheme relies on a serial optical frequency comb based interrogation system to probe an array of fiber Fabry-Perot interferometers fabricated along a single optical fiber. This approach allows a relatively simple interrogator (using a single laser and detector) to probe hundreds of sensors along a single fiber. In addition, this scheme is compatible with extremely long-range operation (hundreds of kilometers) because the sensor self-noise and bandwidth scale inversely with the number of sensors, rather than with the total fiber length. In contrast to traditional interferometric fiber sensors, the sensors described herein are compact (typically a few centimeters) and provide comparable sensitivity due to the cavity resonance effect.

A system is described herein that includes a single interrogator configured to generate an initial pulse. The system further includes a frequency shifting loop configured to generate a serial optical frequency comb based on the initial pulse, the serial optical frequency comb includes a train of pulses equally spaced in time and frequency and is configured to probe an array of sensors positioned along a single fiber for strain sensing.

A method is also described herein that includes generating an initial pulse and generating a serial optical frequency comb based on the initial pulse. The serial optical frequency comb includes a train of pulses equally spaced in time and frequency and is configured to probe an array of sensors positioned along a single fiber for strain sensing.

DETAILED DESCRIPTION

Definitions

Figure 1:
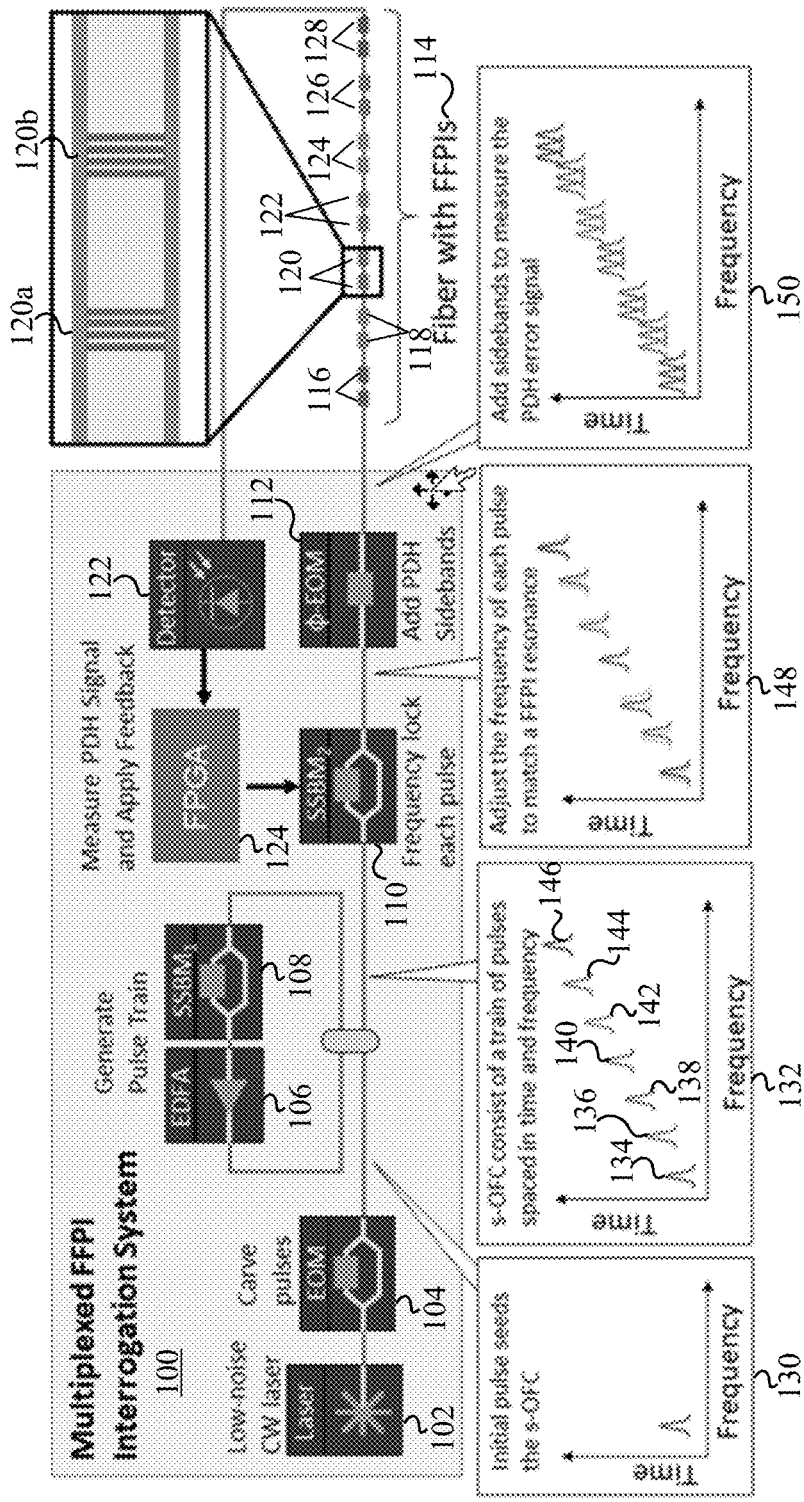
FIG. 1 depicts a multiplexed sensor interrogation system, according to an example embodiment.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

A scalable approach that achieves highly multiplexed fiber optic sensing with an array of tens to hundreds of FFPI sensors positioned along a single fiber is described herein. This approach uses a single seed laser and a frequency-shifting loop to create a serial optical frequency comb. This approach allows a single interrogator, including one seed laser and 1 photodetector, to probe the array of FFPI sensors. This design is compatible with long-range sensing. Moreover, the individual FFPI sensors may be located at any position along the fiber, enabling a host of quasi-distributed long-range sensing applications.

Example Embodiments

The approach presented here has several advantages compared with existing long-range fiber sensing modalities. A single, continuous sensing fiber can be used without requiring optical couplers or any additional components. This is important to maintain a low cost system and reduce transmission loss in order to operate at very long distances. In an embodiment, the interrogation system uses a single laser, a single detector, and a few modulators to probe approximately 100 sensors. This efficient multiplexing allows the system to maintain a low SWAP-C. The sensor sample rate scales inversely with the number of sensors, but not with the overall fiber length (as in most traditional reflectance based fiber sensor modalities). This allows for very long sensing distances without significantly compromising the sensor noise or bandwidth. The individual FFPI sensors may be positioned at any location along the fiber without impacting the sensor noise, bandwidth, or interrogation architecture. This flexibility will allow for a range of operating modalities and use cases including structural health monitoring of pipeline, bridges, etc.

Accordingly, the above embodiment enables quasi-distributed sensing at approximately 100 positions along approximately 100 km length fibers with very low noise ($\sim p\varepsilon/\sqrt{Hz}$) and high sensor bandwidth. This embodiment provides small individual sensors (e.g., 1 cm) along the sensing fiber in order to measure high frequency signals. It is possible to sense sound as well as the direction in which it is coming due to the ability to flexibly position sensors along the sensing fiber to form an array. There are no components required in the fiber such as couplers or wavelength-division multiplexing devices because the embodiment uses a time-gated detector and time-gated Pound-Drever-Hall (PDH) module. The order and time when each pulse is transmitted is known and may be leveraged to isolate the pulse to its corresponding sensor in the time domain. Existing fiber sensing modalities cannot provide these attributes while maintaining a reasonable size, weight, power and cost.

FIG. 1 depicts a multiplexed sensor interrogation system 100, according to an example embodiment. System 100 may include a single interrogator, including a laser 102 and a modulator 104, configured to generate an initial pulse. In example embodiments, laser 102 may be implement by any suitable lasers, for example, a low-noise continuous wave laser or any light beam generator. Modulator 104 may be implemented by any optical modulator that can modulate the light beam generated by laser 102 to generate the initial pulse. System 100 may further include a frequency shifting loop configured to generate a serial optical frequency comb based on the initial pulse shown in plot 130. The comb may include a train of pulses as shown in plot 132 of FIG. 1, including pulses 134, 136, 138, 140, 142, 144, and 146, equally spaced in time and frequency. The comb is configured to probe an array of sensors, including sensors 116, 118, 120, 122, 124, 126, and 128, positioned along a single optical fiber 114 for strain sensing. The frequency shifting loop may include an amplifier 106 and a modulator 108.

System 100 may further include modulator 110 configured to frequency lock each pulse, and a modulator 112 to add PDH sidebands to each of the pulses of the comb. Modulator 112 may be coupled with a first end of fiber 114. In the embodiment shown in FIG. 1, fiber 114 is shown with seven sensors, but the number of sensors may vary depending on the application. The sensors may be uniformly distributed or positioned in any desired manner along fiber 114, such as being highly concentrated in one end and sparsely spaced in the middle of fiber 114, without impacting the sensor noise, bandwidth, or interrogation architecture. The second end of fiber 114 is coupled to a detector 122 that is coupled to a processing circuit 124, which is configured to determine an error signal for each sensor based on the pulse train transmitted through fiber 114, the error signal providing a measurement of strain experienced by each sensor. Processing circuit 124 is also configured to apply the error signal as feedback to modulator 110 to ensure that each pulse of the comb remains continuously locked to a corresponding sensor on fiber 114.

A pair of closely spaced fiber Bragg gratings (FBGs) may be used to form a Fabry-Perot interferometer in the optical fiber. For example, as shown in FIG. 1, each of sensors 116-128 includes a pair of FBGs in fiber 114. In the enlarged view of sensor 120 shown in FIG. 1, sensor 120 includes a first FBG 120*a* and a second FBG 120*b*. Each FBG is designed to reflect particular wavelengths of light and transmits all others. When light shines through the cavity bounded by FBG 120*a* and FBG 120*b*, multiple beam interference occurs. Thus, each time light encounters one of FBG 120*a* or FBG 120*b*, a portion of it is transmitted out and the remaining part is reflected back. The FFPI resonance depends on the optical path-length between the FBGs, which depends on the strain and temperature experienced by the section of fiber containing the FFPI. By measuring the FFPI resonant frequency, the sensors on fiber 114 are able to monitor the strain or temperature at the position of the FFPI. For example, a strain may change the index of the fiber due to its pressure on the fiber. That pressure changes the spacing/distance between FBGs 120*a* and 120*b*, which changes the resonance and that may be measured to determine strain. Other parameters (e.g., temperature or acceleration) may be determined based on the strain measurement.

One approach to measure the FFPI resonance is to use a PDH feedback loop to lock an optical probe to the cavity resonance. In example embodiments, other techniques to measure the FFPI resonance may be utilized. In system 100, the PDH error-signal provides a measurement of the strain or temperature at the position of the FBG cavity. This approach enables sensors approaching the fundamental thermal noise limit of the fiber. In addition, this approach may be used to probe FFPIs positioned at the end of very long fibers enabling the remote interrogation of a high performance sensor.

As shown in FIG. 1, each pulse of the comb may be frequency locked to a different FFPI resonance. For example, starting with laser 102, modulator 104 may be used to carve initial pulse 130, which may be directed to the frequency-shifting loop containing modulator 108 and amplifier 106. During each trip through the loop, modulator 108 may shift the frequency of the pulse (e.g., pulse 130) and amplifier 106 may compensate for loss. The frequency shift may correspond to the nominal frequency spacing of the FBG reflectance bands (e.g., ~10 GHz). This separation allows a given pulse to interrogate one sensor with minimal crosstalk from the other sensors on fiber 114. A fraction of the pulse (typically 10-50%) may be extracted using a fiber optic coupler after each round trip and the rest of the pulse energy remains in the loop to undergo another frequency shift. The total number of pulses may be controlled using modulator 108 (SSBM$_1$). That is, modulator 108 may discard the remaining pulse energy circulating in the loop after the desired number of pulses are generated. Thus, the comb may be generated to include a train of pulses (e.g., pulses 134-146) that are equally spaced in time and frequency. The comb may then be directed to modulator 110 (SSBM$_2$), which is used to fine-tune the frequency of each pulse to lock it to one of the FFPI resonances. Finally, modulator 112 (e.g., a phase modulator (φ-EOM)) is used to add a pair of optical sidebands to each pulse in the comb in order to measure the PDH error signal. To create the sidebands, an electronic radio frequency signal may be provided to modulator 112. The frequency of this electronic signal provides the sideband offset frequency (e.g., a 10 MHz signal creates sidebands with 10 MHz offset). Note that this is different from PDH systems that operate in reflection mode, as these typically use sidebands that are shifted outside of the cavity resonance. The PDH sidebands provide a way to demodulate, to measure how close each pulse is to the center of the cavity resonance.

The train of pulses with sidebands, as shown in plot 150, travels in transmission mode through fiber 114 and is detected by detector 122. Processing circuit 124 is configured to determine the frequency offset as a signal of interest or error signal as it indicates acoustic wave changes to the cavity resonance of each sensor on fiber 114. The frequency offset is also used as a feedback signal to modulator 110 so that each pulse may stay locked on the resonance. Thus, each pulse may be adjusted by the same amount of shift experienced by the cavity of its corresponding sensor.

In an example embodiment, modulator 108 may be used to fine-tune the frequency of each pulse for frequency locking instead of modulator 110. That is, modulator 110 is not strictly required. Instead, the frequency shifts required to lock each pulse to a cavity resonance may be applied directly using modulator 108 inside the frequency shifting loop. In this case, the frequency shift corresponding to the cavity resonance may be added to the nominal frequency shift between FFPIs. In addition, the frequency shift applied to each pulse may need to be adjusted based on the frequency shift applied to the previous pulse. This configuration reduces the number of modulators required, but increases the complexity of the signal driving modulator 108.

Figure 2:
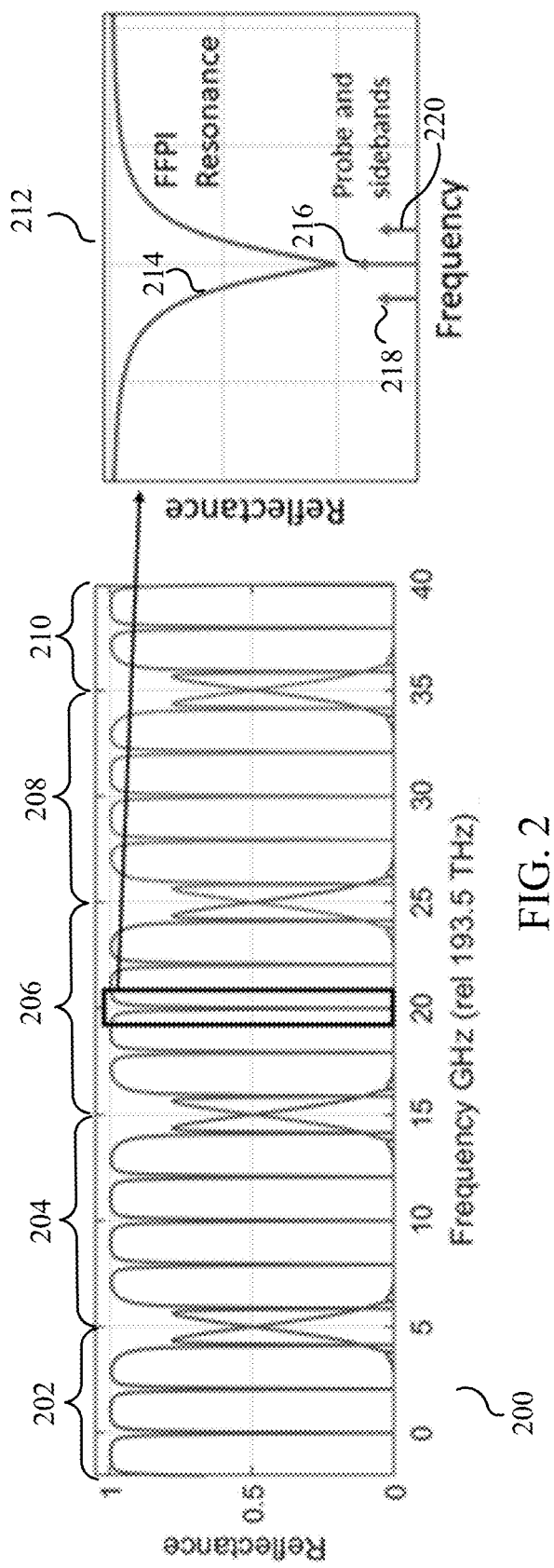
FIG. 2 is a plot depicting reflectance bands for sensors in an optical fiber that may be interrogated by the system of FIG. 1.

As shown in FIG. 1, plots 130, 132, 148 and 150 show the distribution of the pulses of the comb in time-frequency space after each component of system 100. Plot 130 shows the initial pulse carved by modulator 104. This initial pulse is shown as pulse 134 in plot 132. Plot 132 shows the train of pulses 134-146 after the comb is generated in the frequency shifting loop. The comb includes a series or train of pulses that are in the time domain and are increasing in frequency. Plot 148 shows the frequency of each pulse being adjusted by modulator 110 to match a FFPI resonance of each of sensors 116-128 to each pulse on a continuous or periodic basis. The small frequency shifts provided by the sidebands, as shown in plot 148 as each pulse goes from the lighter gray line to the darker gray line, allow the matching of each pulse to the current state of the cavity of the corresponding sensor. Plot 150 shows the comb after PDH sidebands are added by modulator 112 to each pulse. As shown in FIG. 2, each pulse contains three optical frequencies: the center frequency, which is locked to the corresponding FFPI resonance, and two sidebands.

FIG. 2 is a plot 200 depicting reflectance bands for sensors in an optical fiber that may be interrogated by the system of FIG. 1. As shown in plot 200, a first reflectance band 202 corresponds to sensor 116, a second reflectance band 204 corresponds to sensor 118, a third reflectance band 206 corresponds to sensor 120, a fourth reflectance band 208 corresponds to sensor 122, and a fifth reflectance band 210 corresponds to sensor 124. The reflectance band for each sensor is centered at a different optical frequency. For example, sensors with a reflectance bandwidth of approximately 10 GHz may have their center frequencies spaced by approximately 10 GHz, as shown in FIG. 2. In this example, the sensors have FBG spacing of 5 cm. In enlarged plot 212, the reflectance between the matched pair of FBGs for sensor 120 is depicted, i.e., the reflectance of the cavity is shown as a function of frequency. There is a dip in reflectance "on resonance," and a low reflectance is experienced at the resonance frequency and high reflectance at other frequencies where the light is blocked. As shown in enlarged plot 212, the pulse corresponding to sensor 120 has three optical frequency components, a probe 216 at a center frequency and sidebands 218 and 220 equally spaced on either side of probe 216. Because the frequencies of probe 216 and sidebands 218 and 220 are designed to be within the cavity resonant linewidth, all three optical frequencies may be transmitted through the FFPI.

Returning to FIG. 1, the train of pulses transmitted via fiber 114 may be recorded on detector 122 (e.g., a high-speed photodetector) as a transmitted/detected train of pulses. As shown in FIG. 1, fiber 114 is looped back to system 100 so that the transmitted pulses may be recorded on detector 112 in an interrogation system that is configured to be in one housing unit. In an example embodiment, detector 112 and associated components may be placed in a different housing unit from laser 102. The detected signal may be digitized and sent to processing circuit 124 that is configured to determine the PDH error signal for each sensor on fiber 114. This PDH error signal may be used to determine the frequency shift needed to apply to each pulse in the comb (e.g., using modulator 110) in order to lock each pulse to its corresponding FFPI resonance. The error signals simultaneously provide a measurement of the strain experience by each FFPI.

This approach allows a fiber containing N FFPIs to be probed by a train of N pulses using a single seed laser. As an example, if the pulses have a duration of 100 ns and are separated by 25 ns, then a train of 100 pulses would have a duration of 12.5 µs. This would allow the system to probe all 100 FFPIs every 12.5 µs, corresponding to a sample rate of 80 kHz and providing a sensor bandwidth of 40 kHz (more than sufficient for most fiber sensing applications). In the example embodiment shown in FIG. 1, system 100 is designed to operate in transmission mode, in which pulses are transmitted as a train through the sensor cavities, through the entire loop of fiber 114, to be detected at detector 122. Thus, the sensor bandwidth and pulse train repetition rate may be scaled inversely with the number of FFPI sensors positioned along the fiber, but are independent of the total fiber length. This allows the system to probe very long fiber lengths while maintaining low-noise and a large sensor bandwidth. In the frequency domain, 100 FFPIs spaced by 10 GHz may cover 1 THz (or ~8 nm at a wavelength of 1550 nm), which is well within the operating bandwidth of the interrogator components. Frequency shifting loops may generate frequency combs with as many as 1000 frequencies. In other example embodiments, reflection mode may be used instead of transmission mode. In reflection mode, the pulses are transmitted one at a time, and the portion of light that is reflected by a given sensor is measured (e.g., using a beam splitter placed after modulator 112). Any known method may be used to measure the reflected light, such as time of flight to figure out when light came back from a certain distance. While either transmission or reflection mode works, one may be more appropriate for a particular application. For example, transmission mode may be more effective for long ranges and may be a better choice for low signal interferences and noise.

System 100 may be implemented in various ways, not limited to the examples described above. For example, in example embodiments, the FBG based Fabry-Perot cavities may be replaced with other fiber optic cavities with similar transmission spectrum, such as π-phase shifted FBG cavities. In addition, the pulse train and FFPI parameters such as the FFPI resonant frequency spacing, the number of pulses, the duration of the pulses, and the free-spectral range of the cavities may be optimized depending on the application (e.g., the number of sensors required, the total sensing range, and the required bandwidth). In-line amplification along fiber 114 using Raman, Brillouin, or Erbium-doped fiber amplifiers may be used to increase the sensing range, although this may cause the system to be more complex to implement.

Figure 3:
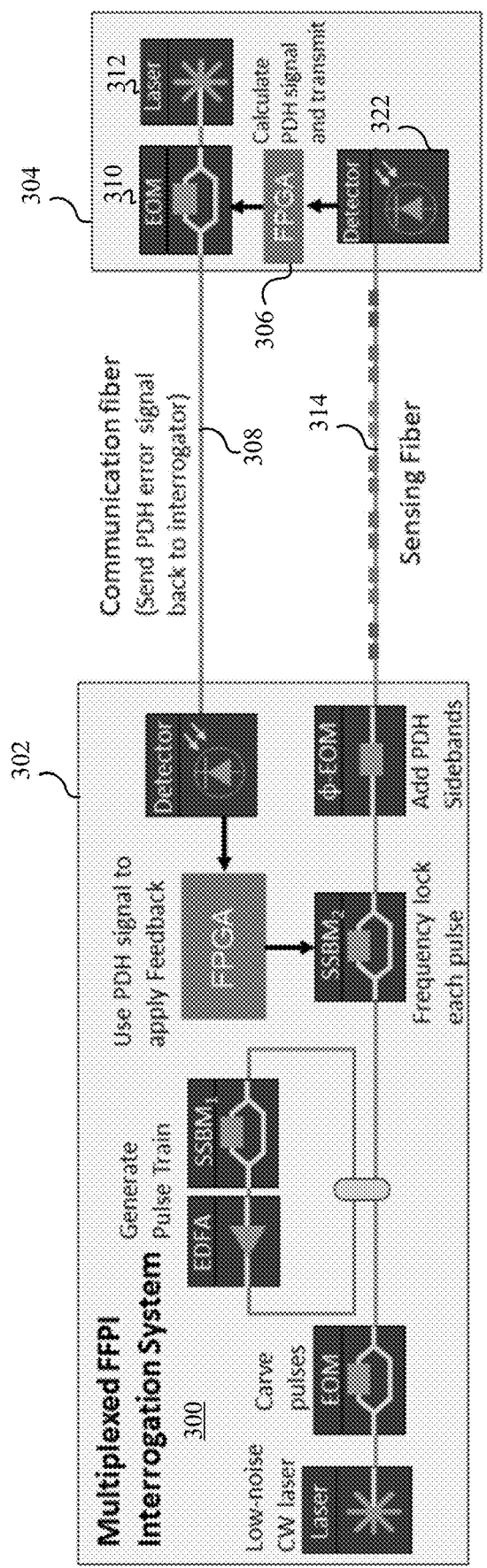
FIG. 3 depicts the multiplexed sensor interrogation system of FIG. 1, according to another example embodiment.

FIG. 3 depicts the multiplexed sensor interrogation system of FIG. 1, according to another example embodiment. FIG. 1 shows system 100 with a looped sensing fiber so that transmitted light may be recorded at the same position (e.g., same housing unit) as the launched light generated by laser 102. This requires light to travel twice as far and accumulate twice the attenuation, which may be a limitation when the sensing fiber is very long (e.g., greater than 100 km). System 300, shown in FIG. 3, provides an alternative approach with many of the same/similar components with similar functionality as those of system 100, thus those components are not described again for the sake of brevity. System 300 includes a first module 302 that includes the components of system 100, already described in FIG. 1 and second module 304, configured to detect and process any transmitted signals (e.g., train of pulses 116-128 shown in FIG. 1) from first module 302. First module 302 and second module 304 may be connected via sensing fiber 314 and communication fiber 308 that is configured to communicate an error signal back to module 302. Second module 304 may include detector 322, a processing circuit 306, a modulator 310, and a laser 312. Detector 322 is configured to detect and/or digitize signal(s) at the end of sensing fiber 314 and transmit it to processing circuit 306 for further processing. Processing circuit 306 may determine an error signal (e.g., PDH signal) that may be used to configure a light beam generated by laser 312 via modulator 310. This error signal may be transmitted to first module 302 to be fed back to the optical frequency comb so that each pulse of the comb remains frequency locked to its corresponding sensor in sensing fiber 314. While this embodiment requires electrical power and/or additional components at both ends of sensing fiber 314, this may be an advantageous trade-off in some applications. The cost and complexity of the additional communication fiber is not significant in this scheme, especially in light of the cost and complexity of having to install sensing fiber 314. However, system 300 may use any other means of communications available to transmit the error signal from second module 304 back to first module 302, for example, using satellite or radio frequency, etc.

The systems described herein may be implemented in various ways, including as shown in FIG. 1 or 3 or with different components in different configurations. For example, any fiber modulators may be used to implement the modulators in these systems, such as electro-optic modulators (EOMs), acousto-optic modulators (AOMs), single-sideband modulators (SSBMs), phase modulators, electro-absorption modulators, etc. Similarly, the required amplifiers may be implemented with erbium-doped fiber amplifiers (EDFAs), semiconductor optical amplifiers (SOAs), Raman amplifiers, Brillouin amplifiers, etc. The processing circuits may be implemented with field programmable gate arrays, application-specific integrated circuits, or any suitable processors or processing circuits. In example embodiments, there may be more or fewer components (e.g., modulators, processors, detectors, etc.).

Figure 4:
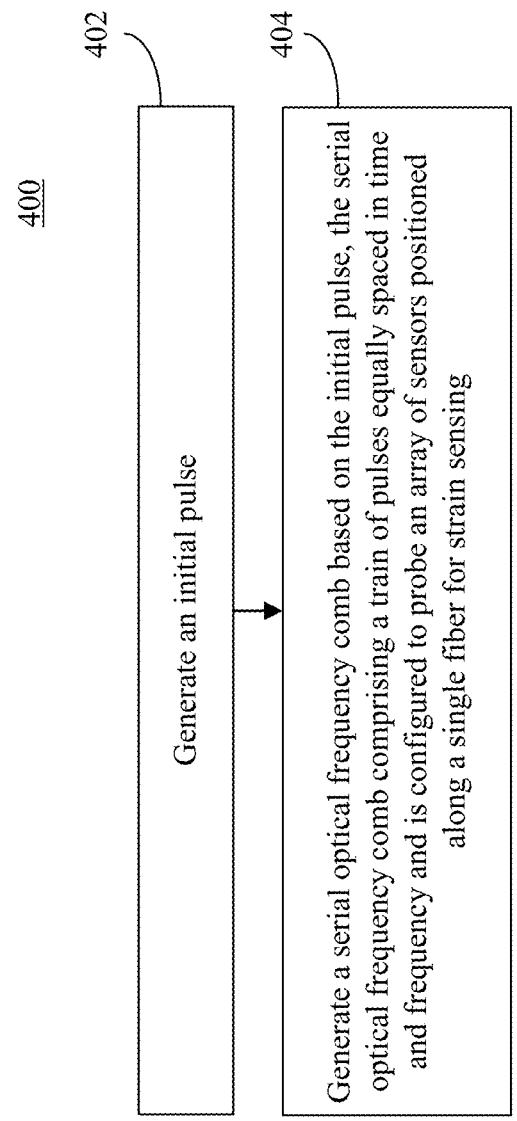
FIG. 4 depicts a flowchart for a method for multiplexed long-range fiber optic sensing, according to an example embodiment.

FIG. 4 depicts a flowchart for a method for multiplexed long-range fiber optic sensing, according to an example embodiment. For example, method 400 may be implemented by system 100 shown in FIG. 1 or system 300 shown in FIG. 3. Thus, method 400 is described with references to these systems. However, method 400 is not limited to these embodiments.

Flowchart 400 begins with step 402, in which an initial pulse is generated. For example, the initial pulse may be generated by a single interrogator that includes a laser 102 configured to generate a light beam that is modulated by modulator 104 to generate the initial pulse, as shown in FIG. 1.

In step 404, a serial optical frequency comb based on the initial pulse is generated. The serial optical frequency comb includes a train of pulses equally spaced in time and frequency and is configured to probe an array of sensors positioned along a single fiber for strain sensing. For example, the comb may be generated with a frequency shifting loop that includes amplifier 106 and modulator 108.

Continuing with the above example, the interrogator may further include a detector (e.g., detector 122 shown in FIG. 1) configured to detect the train of pulses that have been transmitted through the array of sensors as a transmitted/detected train of pulses. A processing circuit (e.g., processing circuit 124 shown in FIG. 1) may be utilized to determine an error signal for each sensor based on the transmitted train of pulses, the error signal providing a measurement of strain experienced by each sensor. A modulator (e.g., modulator 108 and/or modulator 110) may lock each pulse in the train of pulses to a corresponding sensor in the array of sensors. Another modulator (e.g., modulator 112) may add a pair of optical sidebands to each pulse in the train of pulses such that each pulse includes three optical frequencies, including a center frequency locked to a corresponding sensor resonance and two sidebands.

CONCLUSION

While various embodiments of the disclosed subject matter have been described above, it should be understood that they have been presented by way of example only, and not limitation. Various modifications and variations are possible without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
a single interrogator configured to generate an initial pulse; and
a frequency shifting loop configured to generate a serial optical frequency comb based on the initial pulse, the serial optical frequency comb comprising a train of pulses equally spaced in time and frequency and is configured to probe an array of sensors positioned along a single fiber for strain sensing.

2. The system of claim 1, wherein the interrogator comprises
a laser configured to generate a light beam; and
a detector configured to detect the train of pulses that have been transmitted through the array of sensors.

3. The system of claim 2, further comprising:
a first modulator in the frequency shifting loop configured to modulate the light beam to generate the initial pulse; and
a processing circuit configured to determine an error signal for each sensor based on the transmitted train of pulses, the error signal providing a measurement of strain experienced by each sensor.

4. The system of claim 3, wherein the first modulator is further configured to lock each pulse in the train of pulses to a corresponding sensor in the array of sensors.

5. The system of claim 3, further comprising:
a second modulator configured to lock each pulse in the train of pulses to a corresponding sensor in the array of sensors.

6. The system of claim 1, wherein each sensor in the array of sensors comprises a fiber Fabry-Perot interferometer formed with a pair of fiber Bragg gratings.

7. The system of claim 3, further comprising:
a phase modulator configured to add a pair of optical sidebands to each pulse in the train of pulses such that each pulse comprises three optical frequencies, including a center frequency locked to a corresponding sensor resonance and two sidebands.

8. The system of claim 2, wherein the laser and the detector are configured to be in a single housing unit.

9. The system of claim 2, wherein the laser and the detector are configured to be in separate housing units.

10. A method, comprising:
generating an initial pulse;
generating a serial optical frequency comb based on the initial pulse, the serial optical frequency comb comprising a train of pulses equally spaced in time and frequency and is configured to probe an array of sensors positioned along a single fiber for strain sensing.

11. The method of claim 10, further comprising:
generating a light beam; and
detecting the train of pulses that have been transmitted through the array of sensors.

12. The method of claim 11, further comprising:
modulating the light beam to generate the initial pulse; and
determining an error signal for each sensor based on the transmitted train of pulses, the error signal providing a measurement of strain experienced by each sensor.

13. The method of claim 10, further comprising:
locking each pulse in the train of pulses to a corresponding sensor in the array of sensors.

14. The method of claim 10, further comprising:
adding a pair of optical sidebands to each pulse in the train of pulses such that each pulse comprises three optical frequencies, including a center frequency locked to a corresponding sensor resonance and two sidebands.

* * * * *